Patented Dec. 31, 1946

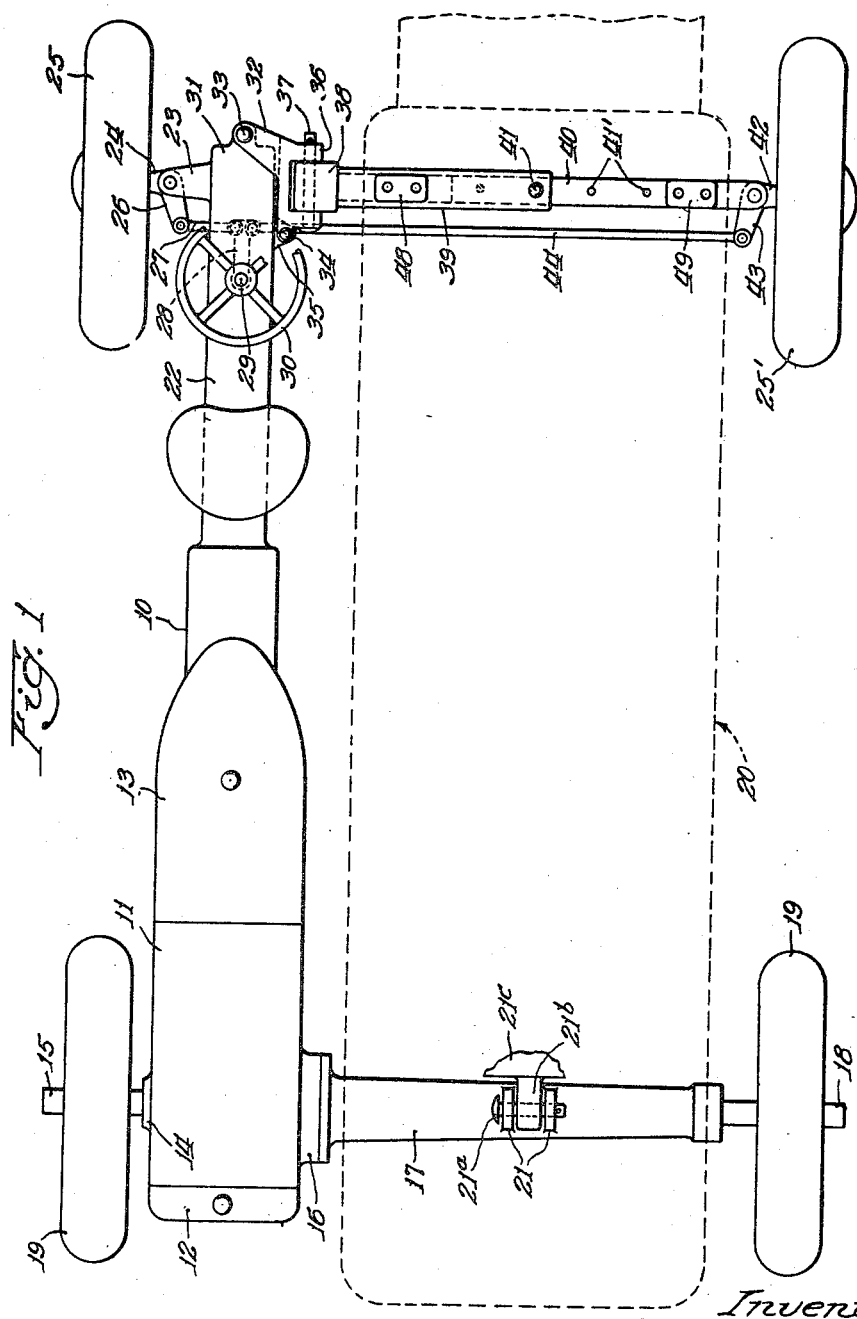

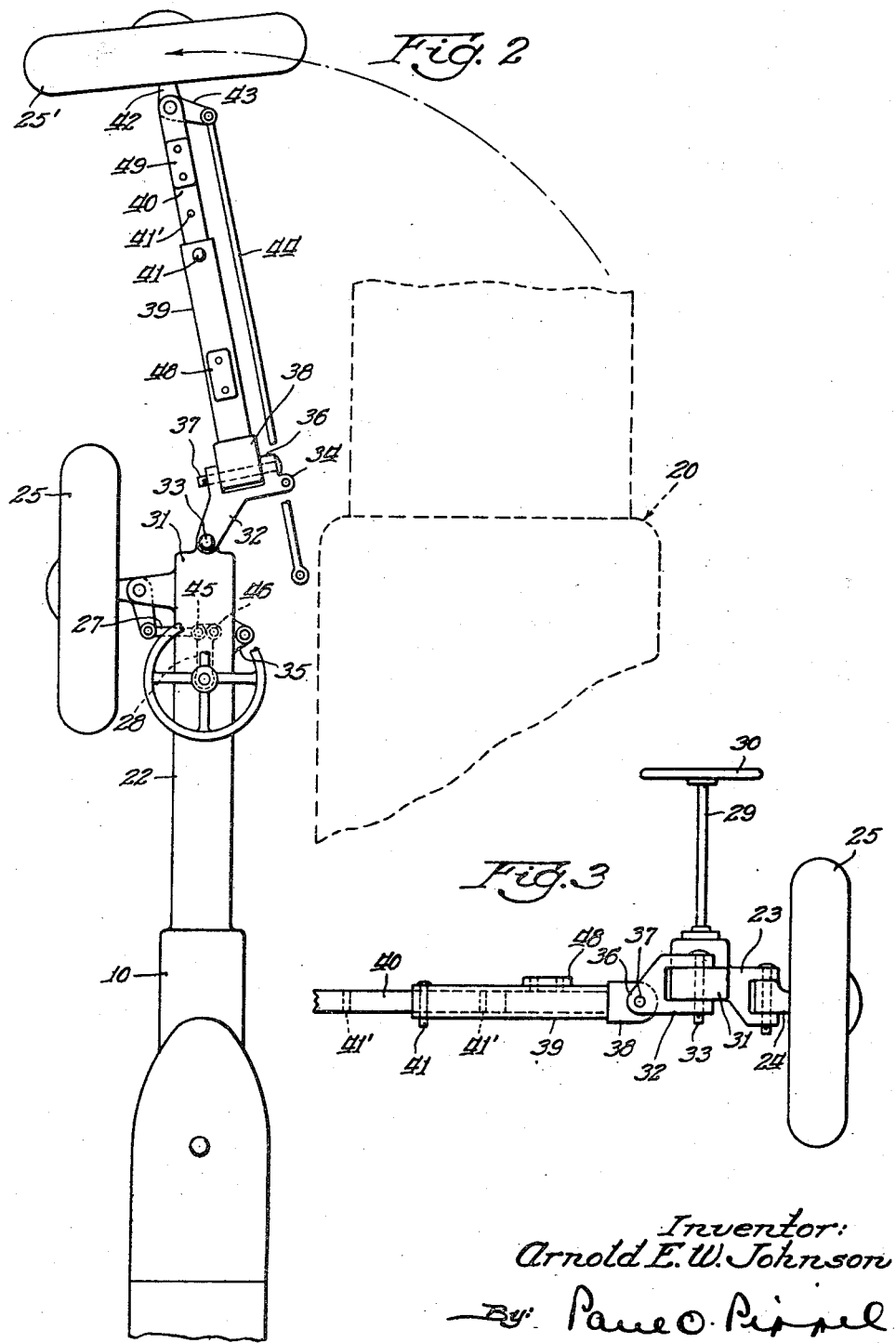

2,413,355

UNITED STATES PATENT OFFICE 2,413,355

AGRICULTURAL TRACTOR

Arnold E. W. Johnson, Oak Park, Ill., assignor to International Harvester Company, a corporation of New Jersey Application December 10, 1943, Serial No. 513,815

18 Claims. (Cl. 180—1)

This invention relates to a tractor, more particularly it relates to an agricultural tractor particularly suitable for mounting implements thereon.

In the development of the general purpose farm tractor, the practice has been to mount cultivators and other light implements directly on the tractor rather than to pull the implements behind the tractor as had been the prior practice. This general trend of attaching implements has been limited to some extent by the type of tractors available. The standard tricycle tractor does not have space available for mounting certain widely used farm machines, such as harvester threshers, nor do the tractors have sufficient load carrying capacity at the front end of the tractor. Balance and weight distribution is also a problem when heavy machines are mounted on a tricycle tractor.

The object of the present invention is to provide a specially constructed tractor which is suitable for mounting large and heavy implements thereon and which is constructed with means for mounting and removing such machines from the tractor.

A more specific object is a provision of a swingable front axle structure to gain access to the space alongside a tractor for mounting an implement.

Another object is the provision of an extensible front axle structure for tread adjustment and for removal of a portion of the axle for access to the space alongside the tractor.

Other objects such as the general arrangement of the units making up the tractor will be apparent from the detailed description to follow.

In the drawings:

Figure 1 is a plan view of a tractor embodying the invention with a dotted outline indicating an implement position;

Figure 2 is a plan view of the front portion of the tractor shown in Figure 1 with the axle swung out in a forward position to show how a large machine may be mounted alongside the tractor; and Figure 3 is a front plan view of the right end of the tractor construction shown in Figure 1.

In the drawings, a tractor is illustrated having a narrow body 10 which carries at the rear end a power plant 11, a radiator 12 and the fuel tank 13 which are indicated by a diagrammatic showing.

At one side of the body 10 of the tractor, at the rear thereof, a short axle housing 14 provides a support for a live drive axle 15. At the other side of the body 10, a short housing 16 is connected to a long axle housing 17 which forms a support for a live drive axle 18. Traction wheels 19 are mounted on the live axles 18 and 15, it being understood that said wheels may be adjusted on said axles as is conventional practice to adjust the tread of the tractor.

The rear end construction as above described constitutes an extended rear axle structure with the power plant being located adjacent one of the drive wheels to thereby provide a wide lateral space between the power plant and the traction wheel at the extended side. This space will depend upon the construction of the tractor, but it is preferred that sufficient space be available for mounting the thresher part of a harvester thresher combination which would occupy a substantial space indicated by the dotted outline 20. To provide means for attaching an implement to the rear axle structure, a pair of upstanding brackets 21 have been shown through openings in which a pin 21$^a$ may extend to secure an attaching member 21$^b$ in position. The member 21$^b$ may be a portion of an implement 21$^c$ which is being secured to the tractor. It is to be understood that the pin 21$^a$ will be loosely fitted and that the member 21$^b$ will be loosely fitted to provide for a limited universal action at this point of connection.

The body 10 of the tractor is narrowed at its forward end 22 and is provided with a rigidly connected offset portion 23 on which a steerable spindle 24 is pivoted on a vertical axis said steerable spindle carrying a wheel 25. A steering arm 26 on the spindle 24 is connected by a steering link 27 with a steerable arm 28 adapted to be operated by a vertical steering shaft 29 which carries a steering wheel 30 on the upper end thereof. It is to be understood that this steering arrangement, as well as various other portions of the tractor have been shown only diagrammatically and that any conventional commercial construction may be utilized, it being desired to show in the drawings only the basic principles of the different elements making up the tractor and the operating connections therebetween.

The narrow body portion 22, which may be considered as the frame of the tractor, is provided at its forward end with an extension 31 on which a front axle connecting structure 32 is pivoted on a vertical axis by means of a pin 33. Said structure on its rear side is formed with a pair of spaced apertured extensions 34 which embrace an extension boss 35 on the frame 22 to provide means for locking the structure 32 against pivoting movement by means of a pin passing through the extensions 34 and the apertured boss 35.

The structure 32 is provided with spaced apertured lateral extensions 36 through which a pivot pin 37 extends, said pin provides means for pivotal securing a front axle securing member 38 for oscillation with respect to the structure 32. The member 38 is secured to the front axle structure which consists of a tubular member 39 secured to the member 38 and a shaft member 40 which is telescopic with respect to a member 39, and which is held against movement with respect thereto by a removable pin 41. Said pin may be inserted with the shaft member 40 in a plurality of positions as a plurality of bores 41' are formed from said member. At its outer end, the member 40 is secured to a steerable front wheel spindle 42 for oscillating movement on a vertical axis to provide for steering of a second front wheel 25' mounted on the spindle 42. A steering arm 43 is connected by a steering link 44 to the steering arm 28 previously described. It will be understood that said arm is provided with spaced apertured portions 45 and 46, the steering links 27 and 44 being pivotally secured respectively to said portions. By means of this construction, the link 44 may be removed without affecting steering of the wheel 25 by the other link.

To provide means for mounting implements on the front axle, two attaching pads 48 and 49 are illustrated. Said pads are formed with a pair of threaded bores whereby any type of bracket rigid or pivoted may be secured thereto. It is essential, however, that if two lateral points of a connection are made on the front axle, it is necessary to have only a single point at the rear, or to provide means for oscillating movement of the rear connection about a longitudinal axis as the front axle structure swings about the pin 37.

With the parts as described and assembled as shown in Figure 1, the tractor may be operated the same as in a four-wheel tractor, both the front wheels being steerable and the swinging movement of the front axle about the pin 37 providing for irregular ground contour. In fact, the tractor is an offset stable tricycle unit with the front axle structure being an additional unit removable or swingable to provide for a space of considerable width and unobstructed in the lengthwise direction for the mounting of implements.

The front axle structure may be entirely removed by disconnecting the connecting structure 32, leaving a stabilized offset tricycle tractor which may be used for any purpose for which it is suitable. For attaching implements such as a harvester thresher, the front axle may be disconnected at the rear locking point of the structure 32 whereby the entire front axle structure may be swung into the position shown in Figure 2. The front axle may also be tilted upwardly about the pin 37 whereby the tractor may be operated with the front axle structure in position to approach an implement and place the tractor in position for mounting implement. The axle structure may then be swung back under the implement and connected in position for operation.

For mounting other types of implements, the two front axle sections may be separated by removing the pin 41 and disconnecting the steering link 44, whereby the wheel 25' and the shaft member 40 may be removed. The implement may then be mounted, after which the wheel and the shaft member may be inserted into position and again connected for operation.

It is to be understood that applicant has shown a preferred embodiment of his improved tractor construction for supporting and mounting various types of implements and that he claims as his invention all modifications falling within the scope of the appending claims.

What is claimed is:

1. A tractor adapted for mounting implements thereon comprising an extended drive axle structure having wide spaced traction wheels, a narrow body and frame structure including a power plant carried by said axle structure adjacent one end thereof, a wheel support rigidly secured to said frame structure, a steerable wheel mounted for vertical pivoting on said support, said wheel being spaced from the drive axle structure, and a wheel supported implement attaching structure flexibly secured to said frame structure and extending laterally therefrom.

2. A tractor adapted for mounting implements thereon comprising an extended drive axle structure having wide spaced traction wheels, a narrow body and frame structure including a power plant carried by the axle structure adjacent one end thereof, a wheel support rigidly secured to said frame structure, a steerable wheel mounted for vertical pivoting on said support, said wheel being spaced from the drive axle structure, and a wheel supported implement attaching structure flexibly connected to the frame structure adjacent the steerable wheel and extending laterally therefrom.

3. A tractor adapted for mounting implements thereon comprising an extended drive axle structure having wide spaced traction wheels, a narrow body and frame structure including a power plant carried by said axle structure adjacent one end thereof, a wheel support rigidly secured to said frame structure, a steerable wheel mounted for vertical pivoting on said support, said wheel being spaced from the drive axle structure, and a wheel supported implement attaching structure extending laterally from the frame structure, said attaching structure being pivoted to the frame structure on a longitudinal axis.

4. A tractor adapted for mounting implements thereon comprising an extended drive axle structure having wide spaced traction wheels, a narrow body and frame structure including a power plant carried by axle structure adjacent one end thereof, a wheel support rigidly secured to said frame structure, a steerable wheel mounted for vertical pivoting on said support, said wheel being spaced from the drive axle structure, and a wheel supported implement attaching structure extending laterally from the frame structure, said attaching structure being releasable from the frame structure for pivoting on a vertical axis.

5. A tractor adapted for mounting implements thereon comprising an extended drive axle structure having wide spaced traction wheels, a narrow body and frame structure including a power plant carried by the axle structure adjacent one end thereof, a wheel support rigidly secured to said frame structure, a steerable wheel mounted for vertical pivoting on said support, said wheel being spaced from the drive axle structure, and a wheel supported implement attaching structure extending laterally from the frame structure, the wheel on the attaching structure being steerable with the other steerable wheel.

6. A tractor adapted for mounting implements thereon comprising an extended rear axle structure having wide spaced traction wheels, a power plant mounted on said axle structure adjacent one end thereof, a narrow body and frame structure extending forwardly from said power plant, a wheel support rigidly secured to said frame structure, a steerable wheel mounted at the front of said frame structure on said support, said wheel and the rear traction wheels providing a stable offset tricycle tractor, and a wheel supported implement attaching structure extending laterally from the front of the frame structure.

7. A tractor adapted for mounting implements thereon comprising an extended rear axle structure having wide spaced traction wheels, a power plant mounted on said axle structure adjacent one end thereof, a narrow body and frame structure extending forwardly from said power plant, a wheel support rigidly secured to said frame structure, a steerable wheel mounted at the front of said frame structure on said support, said wheel and the rear traction wheels providing a stable offset tricycle tractor, and a wheel supported implement attaching structure extending laterally from the front of the frame structure, said attaching structure being pivoted to the frame structure on a longitudinal axis.

8. A tractor adapted for mounting implements thereon comprising an extended rear axle structure having wide spaced traction wheels, a power plant mounted on said axle structure adjacent one end thereof, a narrow body and frame structure extending forwardly from said power plant, a wheel support rigidly secured to said frame structure, a steerable wheel mounted at the front of said frame structure on said support, said wheel and the rear traction wheels providing a stable offset tricycle tractor, and a wheel supported implement attaching structure extending laterally from the front of the frame structure, said attaching structure being releasable for pivoting on a vertical axis with respect to the frame structure.

9. A tractor adapted for mounting implements thereon comprising an extended drive axle structure having wide spaced traction wheels, a narrow body and frame structure including power plant mounted on said axle structure adjacent one end thereof, a narrow body and frame structure extending forwardly from said power plant, a wheel support rigidly secured to said frame structure, a steerable wheel mounted at the front of said frame structure on said support, said wheel and the rear traction wheels providing a stable offset tricycle tractor, and an implement attaching structure connected to the frame structure on a longitudinal axis and extending laterally therefrom, and a steerable supporting wheel at the outer end of said structure.

10. A tractor adapted for mounting implements thereon comprising an extended rear axle structure having wide spaced traction wheels, a power plant mounted on said axle structure adjacent one end thereof, a narrow body and frame structure extending forwardly from said power plant, a wheel support rigidly secured to said frame structure, a steerable wheel mounted at the front of said frame structure on said support, said wheel and the rear traction wheels providing a stable offset tricycle tractor, and a wheel supported implement attaching structure extending laterally from the front of the frame structure, said attaching structure being pivotally connected on a longitudinal axis and releasable for pivoting on a vertical axis with respect to the frame structure.

11. A tractor adapted for mounting implements thereon comprising an extended rear axle structure having wide spaced traction wheels, a power plant mounted on said axle structure adjacent one end thereof, a narrow body and frame structure extending forwardly from said power plant, a wheel support rigidly secured to said frame structure, a steerable wheel mounted at the front of said frame structure on said support, said wheel and the rear traction wheels providing a steerable stable offset tricycle tractor, a front axle structure connected to the front of said frame structure, a steerable wheel mounted on said structure, said axle structure being pivoted adjacent the frame structure on a longitudinal axis, said front axle structure being adjustable in an axial direction and the rear traction wheel on the same side being adjustable with respect to the rear axle structure for adjusting the tread of the tractor.

12. A tractor adapted for mounting implements thereon comprising an extended rear axle structure having wide spaced traction wheels, a power plant mounted on said axle structure adjacent one end thereof, a narrow body and frame structure extending forwardly from said power plant, a wheel support rigidly secured to said frame structure, a steerable wheel mounted at the front of said frame structure on said support, said wheel and the rear traction wheels providing a stable offset tricycle tractor, a front axle structure connected to the front of said frame structure, a wheel mounted on said structure, said axle structure being provided with releasable means for pivoting on a vertical axis for swinging the front axle out of position to provide access for mounting implement structures in the space ahead of the rear axle structure and alongside the frame.

13. A tractor adapted for mounting implements thereon comprising an extended rear axle structure having wide spaced traction wheels, a power plant mounted on said axle structure adjacent one end thereof, a narrow body and frame structure extending forwardly from said power plant, a wheel support rigidly secured to said frame structure, a steerable wheel mounted at the front of said frame structure on said support, said wheel and the rear traction wheels providing a steerable stable offset tricycle tractor, a front axle structure connected to the front of said frame structure, a steerable wheel mounted on said structure, said axle structure being pivoted adjacent the frame structure on a longitudinal axis, said front axle structure being adjustable in an axial direction for adjusting the tread of the tractor.

14. A tractor adapted for mounting implements thereon comprising an extended rear axle structure having wide spaced traction wheels, a power plant mounted on said axle structure adjacent one end thereof, a narrow body and frame structure extending forwardly from said power plant, a wheel support rigidly secured to said frame structure, an offset steerable wheel mounted at the front of said frame structure on said support in alinement with the traction wheel at that side, said wheel and the rear traction wheels providing a steerable stable offset tricycle tractor, a front axle structure pivotally connected to the front of said frame structure, and a steerable wheel mounted on said structure in transverse alinement with the other front wheel and in longitudinal alinement with the traction wheel at its side above.

15. A tractor adapted for mounting implements thereon comprising an extended rear axle structure having wide spaced traction wheels, a power plant mounted on said axle structure adjacent one end thereof, a narrow body and frame structure extending forwardly from said power plant, a wheel support rigidly secured to said frame structure, an offset steerable wheel mounted at the front of said frame structure on said support in alinement with the traction wheel at that side, said wheel and the rear traction wheels providing a steerable stable offset tricycle tractor, a front axle structure connected to the front of said frame structure, and a steerable wheel mounted on said structure in transverse alinement with the other front wheel and in longitudinal alinement with the traction wheel at its side, said axle structure being pivoted adjacent the frame structure on a longitudinal axis.

16. A tractor adapted for mounting implements thereon comprising an extended rear axle structure having wide spaced traction wheels, a power plant mounted on said axle structure adjacent one end thereof, a narrow body and frame structure extending forwardly from said power plant, a wheel support rigidly secured to said frame structure, an offset steerable wheel mounted at the front of said frame structure on said support in alinement with the traction wheel at that side, said wheel and the rear traction wheels providing a steerable stable offset tricycle tractor, a front axle structure connected to the front of said frame structure, and a steerable wheel mounted on said structure in transverse alinement with the other front wheel and in longitudinal alinement with the traction wheel at its side, said axle structure being provided with releasable means for pivoting on a vertical axis for swinging the front axle out of position to provide access for mounting implement structures in the space ahead of the rear axle structure and alongside the frame.

17. A tractor adapted for mounting implements thereon comprising an extended rear axle structure having wide spaced traction wheels, a power plant mounted on said axle structure adjacent one end thereof, a narrow body and frame structure extending forwardly from said power plant, a front wheel support located at the front of said frame structure, means for securing said support to said frame structure against movement with respect thereto, a steerable wheel mounted on said support whereby the tractor may be operated as a steerable stable offset tricycle tractor, and a wheel supported implement attaching structure extending laterally from the front of the frame structure substantially in transverse alinement with said front wheel.

18. A tractor adapted for mounting implements thereon comprising an extended rear axle structure having wide spaced traction wheels, a power plant mounted on said axle structure adjacent one end thereof, a narrow body and frame structure extending forwardly from said power plant, a front wheel support located at the front of said frame structure, means for securing said support to said frame structure against movement with respect thereto, a steerable wheel mounted on said support whereby the tractor may be operated as a steerable stable offset tricycle tractor, and a wheel supported implement attaching structure extending laterally from the front of said frame structure, said attaching structure being pivoted to the frame structure on a longitudinal axis.

ARNOLD E. W. JOHNSON.